United States Patent [19]

Seeley et al.

[11] Patent Number: 5,513,770
[45] Date of Patent: May 7, 1996

[54] PREVENTION OF CHILDREN DROWNING IN PAILS

[75] Inventors: Robert T. Seeley, Brookfield Center; Robert J. Dempsey, Trumbull, both of Conn.

[73] Assignee: Olin Corporation, Cheshire, Conn.

[21] Appl. No.: 500,279

[22] Filed: Jul. 10, 1995

[51] Int. Cl.$^6$ ..................................................... B65D 1/40
[52] U.S. Cl. ........................ 220/729; 220/288; 220/702; 215/330; 215/356
[58] Field of Search ....................... 220/288, 694, 220/699, 700, 701, 702, 729, 730, 731, 890; 215/263, 330, 356, 357

[56] References Cited

U.S. PATENT DOCUMENTS

| 678,985 | 7/1901 | Sitterly . |
| 4,726,490 | 2/1988 | Bonnema et al. . |
| 4,878,590 | 11/1989 | Porter . |
| 5,183,179 | 2/1993 | Morris . |

FOREIGN PATENT DOCUMENTS

| 938024 | 9/1948 | France . |
| 185342 | 7/1922 | United Kingdom . |

OTHER PUBLICATIONS

Proposed Rules of Consumer Product Safety Commission on Plastic Buckets published Jul. 8, 1994 in Federal Register (vol. 59, No. 130).

Primary Examiner—Stephen Cronin
Attorney, Agent, or Firm—William A. Simons

[57] ABSTRACT

An insert is positioned in the upper end of a pail, which pail contains a liquid. The insert blocks entry of a child's head into the pail. The insert is screwed into the upper end of the pail. Mating locking detents are provided on the pail and on the insert so that the insert, once screwed into the pail, cannot be thereafter unscrewed from the pail. The insert allows ready withdrawal of the liquid from the pail. A child in the vicinity of a pail equipped with the aforesaid insert is protected from drowning in a liquid contained in the pail because insert prevents a child from accidentally, or intentionally, inserting his or her head into the pail.

3 Claims, 2 Drawing Sheets

PREVENTION OF CHILDREN DROWNING IN PAILS

BACKGROUND OF THE INVENTION

1. Field of the Invention

This invention relates to a structure for preventing children from drowning in a pail, which pail contains a liquid that is present in amounts sufficient to suffocate a child who should happen to fall into the pail.

2. Brief Description of Prior Art

It has been determined that certain containers, commonly referred to as "five gallon plastic pails", pose a risk of injury or drowning to young children. There have been more than two hundred fifty documented instances over the past ten years of young children falling head-first into plastic pails containing liquids with resultant injury or drowning. Five gallon containers are used for bulk or commercial-sized quantities of a wide variety of products, including food, paint, and construction materials such as spackling compound. When emptied of their original contents, these containers are sometimes reused as pails by consumers. Similar five gallon containers are also sold new in stores as large-volume household pails.

It is surmised that young childrens' curiosity, combined with their crawling and pulling up while learning to walk, can lead to drowning when pails are used around the house. The aforesaid injuries and drownings can occur, for example, if a curious child were to crawl to a pail containing mop water, or some other liquid for use in performing household chores, and then pull him or herself up on the pail and lean forward to play in the water or to retrieve an object. Should the child topple into the pail, he or she may be unable to free themselves. These drownings can occur with just a few inches of liquid in the bottom of the pail. Given the size and shape of such pails, and their stability when they contain only a small amount of liquid, they may not tip over when a child leans over them and falls in.

U.S. Pat. No. 5,183,179 granted Feb. 2, 1993 to G. H. Morris deals with the problem of children drowning in pails, and suggests as a solution the inclusion of an integral pedestal in the bottom of the pail which pedestal projects upwardly toward the top of the pail a sufficient distance to prevent a child's head from descending into any liquid contained in the pail. The pedestal extends upwardly at least half the height of the pail, and is of sufficient diameter to produce a radial space in the pail which contains the liquid therein, which radial space is less than the diameter of the head of the typical toddling child. This solution requires the manufacture of specialized pails and the presence of the pedestal in the pail decreases the amount of liquid or other material that the pail can hold. The pedestal also limits the range of possible uses for the pail. For example, these specially configured pails will not be readily usable as mop pails. It is therefore submitted that the aforesaid solution to the problem of child drowning or injury in pails is impractical and is not likely to be commercially viable. Other solutions to the problem have been suggested, such as: rendering the pails unstable and readily tippable if a child were to lean on the pail; or rendering the pails incapable of being reused with liquids. In the latter case, the pails would contain original contents packaged in liners which are positioned in the pails. If one were to render pails unstable, their use would be severely limited because they would be prone to tipping over for many different reasons so that their contents would be in danger of spilling all of the time. If one were to render pails incapable of containing a liquid without also containing a liner, this would not address the intentional use of pails for household chores which are intended to contain liquids; and would also not stop one from putting liquids in the pails if one were to leave the liner in the pail.

BRIEF SUMMARY OF THE INVENTION

This invention is directed to a solution to the problem of children being injured by falling into pails, or even drowning in pails, which pails contain liquids. The invention is particularly useful in guarding against accidental injuries or child drownings in a household using a commonplace five gallon pail. The solution to the problem involves the use of a grate for restricting access to the interior of the pail. The grate preferably takes the form of an insert which is screwed into the top of the pail. The insert is preferably formed from injection molded plastic and includes a radially outermost surface which is provided with external threads that complement an internal thread formed on the pail with which the insert is to be used thus, the insert can be screwed into the pail by an adult. The insert also is provided with detent locks, preferably in the form of ratchet teeth, which mate with a detent locking ring, preferably in the form of ratchet teeth, so that when the insert is screwed into the pail, it cannot thereafter be unscrewed from the pail. The insert has a circular outer part and a plurality of barrier bars which extend across the outer part and that are spaced apart from each other and from the outer part so as to provide a maximum amount of access to the interior of the pail while preventing a child's head from entering the pail. The barrier bars are spaced apart a sufficient distance to easily allow any liquids in the pail to be easily poured therefrom while at the same time allowing ready access into the pail by implements such as a mop or the like, which use liquids contained in the pail to perform household chores.

It is, therefore, an object of this invention to provide a pail assembly which includes an insert which can be screwed into a pail and is operable to prevent a child's head from entering the pail while allowing conventional household implements to be easily inserted into and withdrawn from the pail.

It is a further object of the invention to provide a pail assembly of the character described which positively prevents the insert from being unscrewed from the pail.

BRIEF DESCRIPTION OF THE DRAWINGS

This and other objects and advantages of the invention will become more readily apparent from the following detailed description of a preferred embodiment of the invention when taken in conjunction with the accompanying drawings, in which.

DESCRIPTION OF EMBODIMENT OF THE INVENTION

Figure 1:
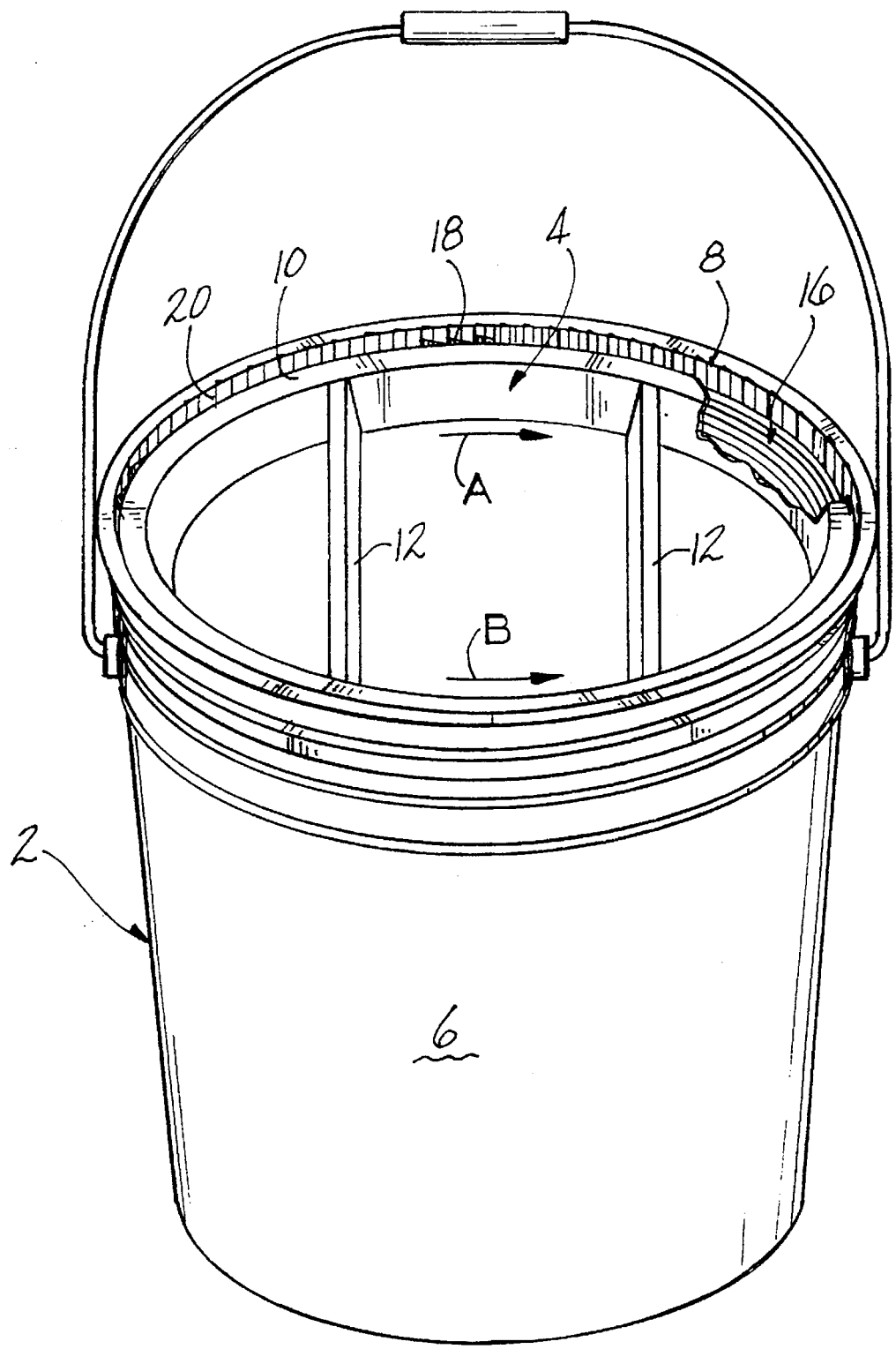
FIG. 1 is a perspective view of a conventional five gallon, or other volume, pail that includes a protective grate in the form of an insert that is formed in accordance with this invention.

Referring now to the drawings there is shown a preferred embodiment of a pail and protective grate combination formed in accordance with this invention. The pail is denoted by the numeral 2, and the grate takes the form of an insert 4 which is screwed into the pail 2. The pail 2 has a downwardly and inwardly tapered side wall 6 and an uppermost rim 8. The insert 4 has an outer side wall 10 that conforms to the shape of the pail rim 8. The insert 4 has two transverse bars 12 which extend in chord fashion across the insert 4 between opposite segments of the side wall 10. The bars 12 are spaced apart a distance D which is large enough to allow an implement such as a sponge or a mop, or the like, to be inserted into the pail 2; but which is small enough to prevent passage of a toddler's head into the pail 2. The distance D will typically be about five and one half inches for an eleven inch diameter pail, and the maximum distances D' between the bars 12 and adjacent segments of the side wall 10 will typically be about two and one quarter inches. Each component of the insert 4 (i.e., the outer edge as well as the bars) is about one quarter inch in thickness. Thus, the insert 4 is operable to occupy less than about ten percent (10%) of the area of the inside of the pail rim.

Figure 2:
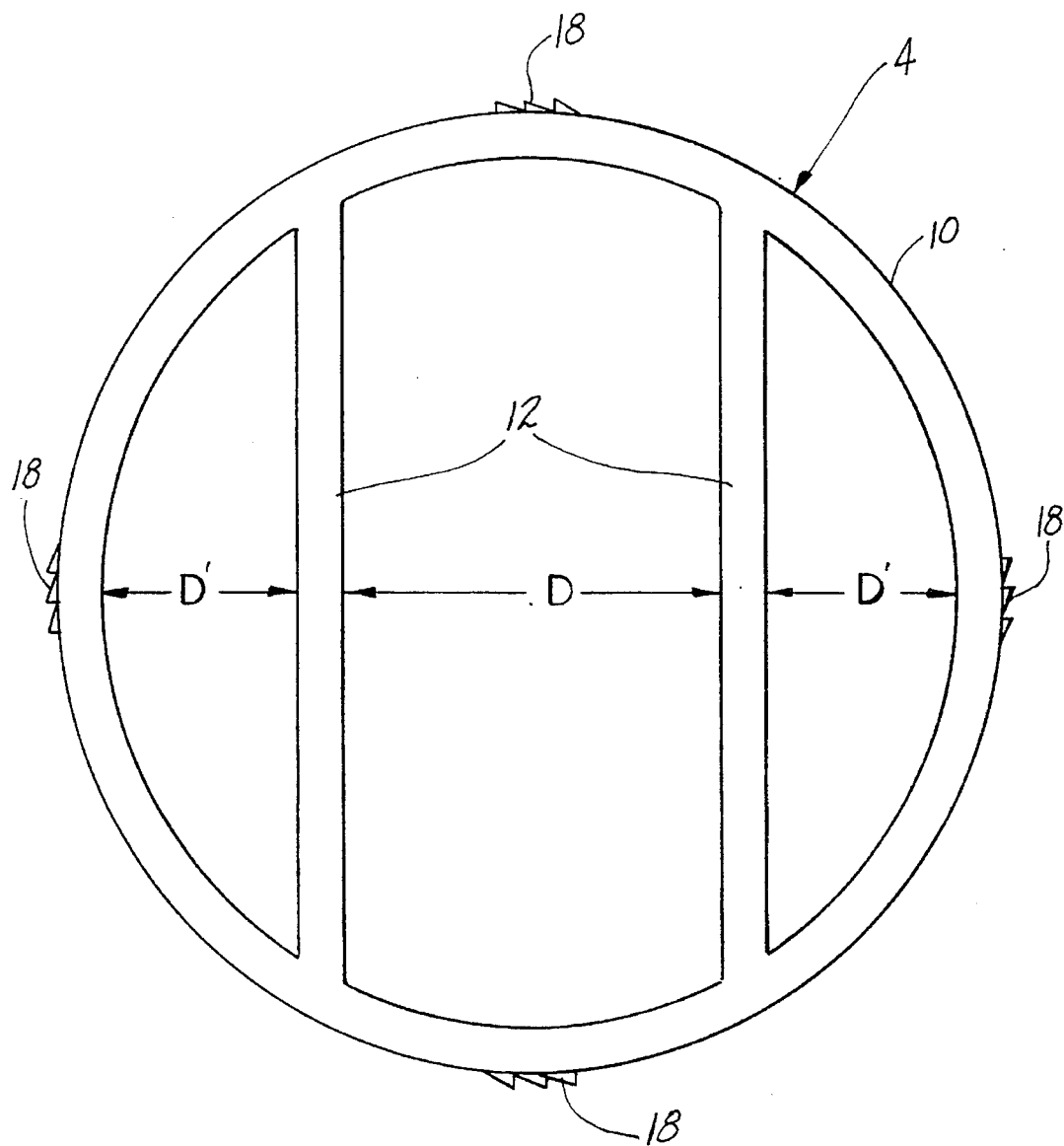
FIG. 2 is a plan view of the insert of this invention.
Figure 3:
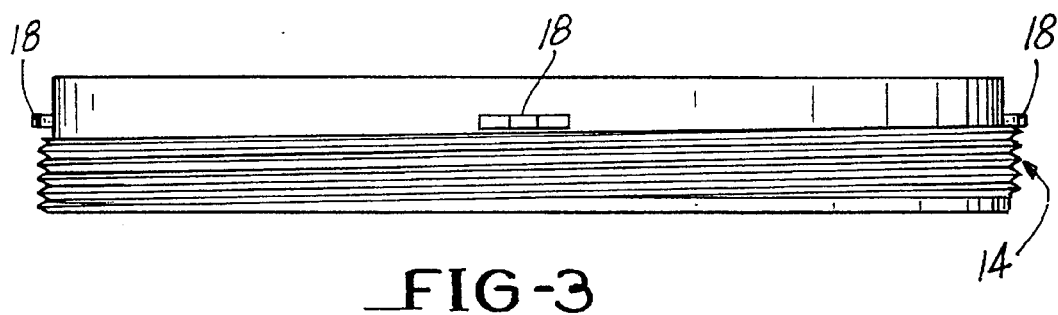
FIG. 3 is a side view of the insert.

The inset 4 is provided with external threads 14 which match internal threads 16 formed in the rim 8 of the pail 6. The insert 4 is thus screwed to the pail 6 by being rotated in the direction of the arrow A. The insert 4 is also provided with sets of ratchet teeth 18, and the pail 6 is provided with a continuous band of complementary ratchet teeth 20. The mating ratchet teeth 18 and 20 will allow coupling rotation of the insert 4 in the pail in the direction of the arrow A, but, once engaged, will prevent uncoupling rotation of the insert 4 in the direction of the arrow B. Thus, once the insert 4 is seated in the pail 6, it cannot thereafter be removed from the pail 6. It will be noted that by properly offsetting the ratchet teeth, sets 18 by 90° increments from each other, as shown in FIG. 2, the teeth sets 18 can be positioned on radially flexible portions of the insert rim 10 so as to promote engagement of the insert locking teeth as the insert 4 is screwed into the pail 6.

It will be appreciated that the pail-grate combination of this invention will provide protection against toddler injury or drowning, but will not disable the pail from being used to perform common household chores, such as washing with a liquid contained in the pail, painting with a stain or paint contained in the pail. The insert can be sold as a separate item, or it can be packaged with pails which contain a myriad of materials, or are sold empty to the consumer.

While ratchet teeth are preferred for locking the insert to the pail, other suitable unidirectional rotational detent structures could also be used.

Since many changes and variations of the disclosed embodiment of the invention may be made without departing from the inventive concept, it is not intended to limit the invention otherwise than as required by the appended claims.

What is claimed is:

1. An assembly for containing a liquid substance, and which provides protection against injury or drowning to a toddler from falling into the assembly, said assembly comprising:

(a) a pail for containing the liquid substance, said pail having a side wall and an upper open rim providing an access area to the liquid in the pail;

(b) an insert disposed in the open rim of the pail, said insert occupying a sufficient percentage of said pail rim access area to prevent a toddler's head from penetrating the pail rim, while at the same time allowing full access through the pail rim to a liquid contained in the pail, said insert being rotatably coupled with the pail rim; and (c) said insert having an outermost surface formed with an antirotational detent, and said pail rim being formed with a complementary antirotational detent, said antirotational detents being operable to allow said insert to be rotationally coupled to said pail and further being operable to prevent said insert from being rotatably uncoupled from said pail.

2. The assembly of claim 1 wherein said insert includes an external thread on an outer periphery thereof, and wherein said pail rim includes a mating internal thread whereby said insert can be screwed into said pail rim.

3. The assembly of claim 2 wherein said antirotational detents comprise complementary ratchet teeth formed on said insert and in said pail rim, said complementary ratchet teeth allowing said insert to be screwed into said pail rim while preventing said insert from being unscrewed from said pail rim.

* * * * *